(12) United States Patent
Han et al.

(10) Patent No.: US 12,722,343 B2
(45) Date of Patent: Sep. 1, 2026

(54) CONTROL APPARATUS AND METHOD FOR 3D PRINTER POST-PROCESSING EQUIPMENT

(71) Applicant: ELECTRONICS AND TELECOMMUNICATIONS RESEARCH INSTITUTE, Daejeon (KR)

(72) Inventors: Hyo Nyoung Han, Daejeon (KR); Min Gi Kim, Daejeon (KR); Chang Beom Kim, Daejeon (KR); Ji Yeon Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 381 days.

(21) Appl. No.: 18/490,909

(22) Filed: Oct. 20, 2023

(65) Prior Publication Data

US 2024/0131796 A1 Apr. 25, 2024
US 2024/0227302 A9 Jul. 11, 2024

(30) Foreign Application Priority Data

Oct. 21, 2022 (KR) ........................ 10-2022-0136521
Sep. 11, 2023 (KR) ........................ 10-2023-0120621

(51) Int. Cl.
*B29C 64/386* (2017.01)
*B29C 64/264* (2017.01)
(Continued)

(52) U.S. Cl.
CPC .......... *B29C 64/386* (2017.08); *B29C 64/264* (2017.08); *B29C 64/35* (2017.08); *B33Y 40/20* (2020.01)

(58) Field of Classification Search
CPC ... B29C 64/106; B29C 64/112; B29C 64/295; B33Y 10/00; B33Y 30/00; B33Y 50/02;
(Continued)

(56) References Cited

U.S. PATENT DOCUMENTS 10,432,800 B1 10/2019 Bae
11,390,031 B2 * 7/2022 De Pena ................ B29C 64/35
(Continued)

FOREIGN PATENT DOCUMENTS

KR 10-2078575 B1 2/2020
KR 10-2020-0075155 A 6/2020

OTHER PUBLICATIONS

Rapidshape_katalog_industry_EN(2022).
Office Action of the KR application No. 10-2023-0120621 dated Dec. 8, 2025.

*Primary Examiner* — Ronald D Hartman, Jr.
(74) *Attorney, Agent, or Firm* — LRK PATENT LAW FIRM

(57) ABSTRACT

Provided are a control apparatus and method for three-dimensional (3D) printer post-processing equipment. The control apparatus includes a processor, and a memory configured to store an instruction executed by the processor, wherein the processor analyzes a computer-aided design (CAD) file to extract basic information of a product, analyzes a slicing file to extract output analysis information, then extracts output feature information on the basis of the basic information and the output analysis information, analyzes the output feature information to extract a parameter for controlling post-processing equipment, and controls the post-processing equipment according to the parameter.

20 Claims, 12 Drawing Sheets

(51) Int. Cl.
*B29C 64/35* (2017.01)
*B33Y 40/20* (2020.01)

(58) Field of Classification Search
CPC ......................... G05B 19/418; G05B 19/4097; G05B 19/402; G06F 9/445; G06F 17/50; G06F 30/23
USPC .......................................................... 700/256
See application file for complete search history.

(56) References Cited

U.S. PATENT DOCUMENTS

| | | | | |
|---|---|---|---|---|
| 11,813,776 | B2 * | 11/2023 | Hutchinson | B29C 64/35 |
| 2013/0248491 | A1 * | 9/2013 | Swanson | B29C 64/40<br>156/345.23 |
| 2015/0045928 | A1 * | 2/2015 | Perez | B29C 48/865<br>700/110 |
| 2015/0331402 | A1 * | 11/2015 | Lin | G05B 15/02<br>700/119 |
| 2017/0036401 | A1 * | 2/2017 | Donovan | B22F 10/20 |
| 2017/0106599 | A1 * | 4/2017 | Astovasadourian | B29C 64/386 |
| 2017/0256093 | A1 | 9/2017 | Choi et al. | |
| 2018/0253857 | A1 * | 9/2018 | Driegen | G06T 7/85 |
| 2019/0095418 | A1 * | 3/2019 | Gonzalez | G06F 40/221 |
| 2019/0168446 | A1 | 6/2019 | Leibig et al. | |
| 2019/0202132 | A1 | 7/2019 | De Pena et al. | |
| 2020/0202621 | A1 * | 6/2020 | Béraud | G06T 17/05 |
| 2021/0206096 | A1 * | 7/2021 | Mansouri | B08B 3/04 |
| 2022/0402211 | A1 * | 12/2022 | Stadlmann | B08B 13/00 |
| 2023/0091181 | A1 * | 3/2023 | Crabtree | B33Y 40/20<br>134/186 |

* cited by examiner

100
MEMORY
200
PROCESSOR
210
212
INPUT INFORMATION ANALYSIS UNIT
214
DESIGN MODEL INFORMATION ANALYSIS UNIT
216
OUTPUT MODEL INFORMATION ANALYSIS UNIT
218
INTEGRATED INFORMATION ANALYSIS UNIT
220
PARAMETER EXTRACTION UNIT
230
EQUIPMENT INTERLOCKING CONTROL UNIT
300
POST-PROCESSING EQUIPMENT
CAD FILE
SLICING FILE

CONTROL APPARATUS AND METHOD FOR 3D PRINTER POST-PROCESSING EQUIPMENT

CROSS-REFERENCE TO RELATED APPLICATIONS

This application claims priority to and the benefit of Korean Patent Application Nos. 10-2022-0136521 and 10-2023-0120621, filed on Oct. 21, 2022 and Sep. 11, 2023, respectively, the disclosure of which is incorporated herein by reference in its entirety.

BACKGROUND

1. Field of the Invention

The present invention relates to a control apparatus and method for three-dimensional (3D) printer post-processing equipment.

2. Description of Related Art

Three-dimensional (3D) printers (3D additive manufacturing equipment) have been spotlighted as next-generation cutting-edge manufacturing equipment because they can manufacture items rapidly and conveniently. In particular, because the production speed of liquid additive manufacturing equipment is very high as compared to other methods, there are many applications for applying the liquid additive manufacturing equipment to finished products and parts manufacturing sites. However, outputs from liquid additive manufacturing equipment cannot be used directly in a solid or liquid state. In order to produce outputs from liquid additive manufacturing equipment as actual products, post-processing processes such as washing, drying, curing, and the like should be performed on the outputs.

Post-processing processes are performed manually by operators. Operators set and control setting values of each process facility in detail based on experience. Operators perform processes while adjusting the setting values according to the sizes, quantity, and shapes of products, and people manually move objects between the processes.

Further, since dedicated chemicals are used in post-processing processes such as optical 3D printing, washing, and the like, work should be done in a separate space with good ventilation. A demand for minimizing human work in handling harmful materials has arisen.

The related art of the present invention is disclosed in Korean Laid-open Patent Publication No. 10-2020-0075155 (Published on Jun. 26, 2020).

SUMMARY OF THE INVENTION

The present invention is directed to providing a control apparatus and method for three-dimensional (3D) printer post-processing equipment, in which post-processing processes of a 3D printer are automated so that the quality of outputs is improved and human work is minimized.

According to an aspect of the present invention, there is provided a control apparatus for 3D printer post-processing equipment, which includes a processor, and a memory configured to store an instruction executed by the processor, wherein the processor analyzes a computer-aided design (CAD) file to extract basic information of a product, analyzes a slicing file to extract output analysis information, then extracts output feature information on the basis of the basic information and the output analysis information, analyzes the output feature information to extract a parameter for controlling post-processing equipment, and controls the post-processing equipment according to the parameter.

The processor may convert the CAD file into a file of a preset setting type, extract a type of an object to be output on the basis of the number of files in the CAD file, and analyze the slicing file to determine whether the slicing file is a file of a nozzle-type 3D printer or a file of an optical 3D printer.

The output feature information may be at least one of a product size, a product shape, a product volume, the number of products, and a filling level.

The processor may analyze an outermost point of the product to extract the product size.

The processor may image the product in various ways to extract the product shape using an image processing method.

The processor may extract the product volume by performing integration on an area between layers of the product on the basis of point, line, and surface information of the product.

When it is determined that the slicing file is a file of a nozzle-type 3D printer, the processor may analyze the product shape on the basis of the presence or absence of nozzle output in G-code to extract the number of products, or when it is determined that the slicing file is a file of an optical 3D printer, the processor may distinguish a contrast part and a non-contrast part in a tomographic contrast image, stack the contrast part and the non-contrast part according to a list, and extract the number of products.

The processor may extract the filling level using the product volume, the number of products, and a total output material usage for all outputs, and extract the total output material usage using amounts of materials used in the product.

The processor may analyze the output feature information to extract the parameter, extract a schedule for controlling operation of the post-processing equipment according to the parameters, and control the post-processing equipment according to the schedules and the parameter.

The processor may extract the schedule according to divided operation information and operation time of the post-processing equipment and a travel time between pieces of the post-processing equipment.

The parameters may include at least one of washing device parameters for controlling a washing device, curing a device parameter for controlling a curing device, and drying a device parameter for controlling a drying device, wherein the washing device parameter may include at least one of a temperature, an operating time, and a flow rate of the washing device, the curing device parameter may include at least one of the quantity of light and an operating time of the curing device, and the drying device parameter may include at least one of a temperature, an operating time, and an air volume of the drying device.

The processor may transmit the parameter to the post-processing equipment, and the post-processing equipment may perform post-processing processes according to the parameter.

The processor may control at least one of a washing temperature, a washing time, a washing flow rate, and transfer of an output of the washing device that washes the output.

The processor may control at least one of the quantity of light, a curing time, and transfer of an output of the curing device that cures the output.

The processor may control at least one of a drying temperature, a drying time, an air volume, and transfer of outputs of the drying device that dries the outputs.

The processor may allow a management device that manages the output to control at least one of output of an output from the 3D printer, separation of the output from a base plate, removal of resin on the output, and transfer of the output between devices.

According to another aspect of the present invention, there is provided a control method for three-dimensional (3D) printer post-processing equipment, which includes analyzing, by a processor, a CAD file to extract basic information of a product, analyzing a slicing file to extract output analysis information, and extracting output feature information on the basis of the basic information and the output analysis information, and analyzing, by the processor, the output feature information to extract a parameter for controlling post-processing equipment, and controlling the post-processing equipment according to the parameter.

The output feature information may be at least one of a product size, a product shape, a product volume, the number of products, and a filling level.

In the controlling of the post-processing equipment, the processor may analyze the output feature information to extract the parameter, extract a schedule for controlling operation of the post-processing equipment according to the parameter, and control the post-processing equipment according to the schedule and the parameter.

The parameter may include at least one of washing a device parameter for controlling a washing device, curing a device parameter for controlling a curing device, and drying a device parameter for controlling a drying device, wherein the washing device parameter may include at least one of a temperature, an operating time, and a flow rate of the washing device, the curing device parameter may include at least one of the quantity of light and an operating time of the curing device, and the drying device parameter may include at least one of a temperature, an operating time, and an air volume of the drying device.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, examples of a control apparatus and method for 3D printer post-processing equipment according to embodiments of the present invention will be described. In this process, thicknesses of lines, sizes of components, and the like shown in the accompanying drawings may be exaggerated for clarity and convenience of description. Further, some terms which will be described below are defined in consideration of functions in the present invention and meanings may vary depending on, for example, a user or operator's intentions or customs. Therefore, the meanings of these terms should be interpreted based on the scope throughout this specification.

Figure 1:
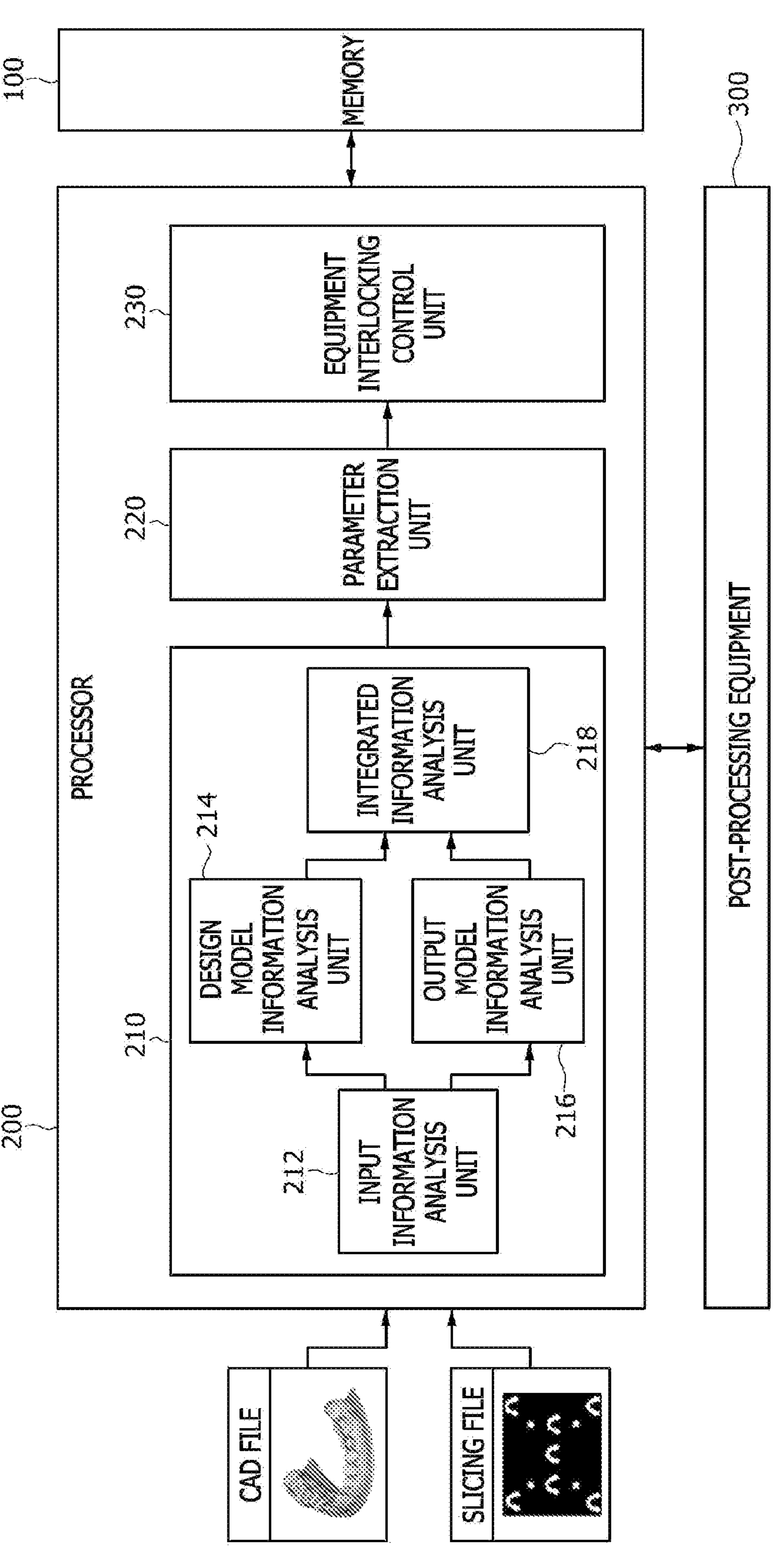
FIG. 1 is a block diagram of a control apparatus for three-dimensional (3D) printer post-processing equipment according to an embodiment of the present invention.
Figure 2:
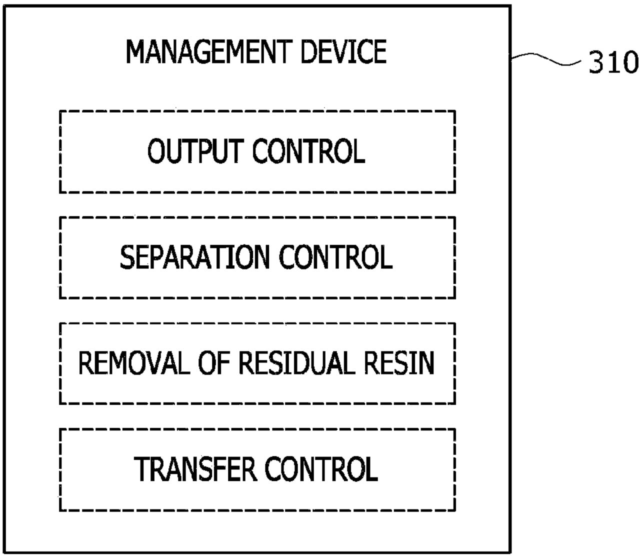
FIG. 2 is an exemplary view of a control operation of a management device according to an embodiment of the present invention.
Figure 3:
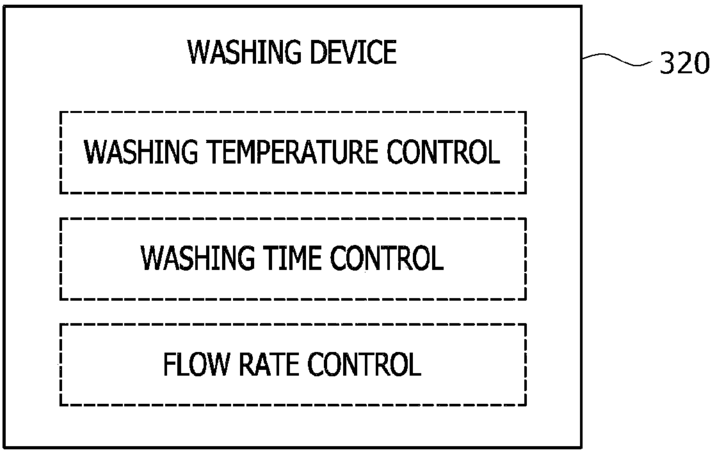
FIG. 3 is an exemplary view of a control operation of a washing device according to an embodiment of the present invention.
Figure 4:
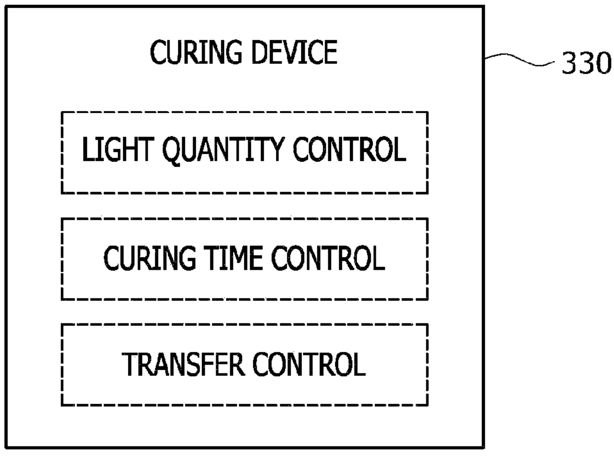
FIG. 4 is an exemplary view of a control operation of a curing device according to an embodiment of the present invention.
Figure 5:
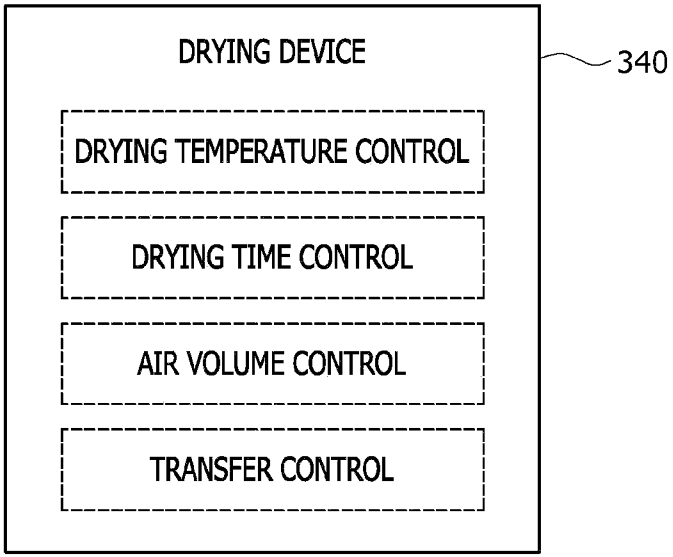
FIG. 5 is an exemplary view of a control operation of a drying device according to an embodiment of the present invention.

FIG. 1 is a block diagram of a control apparatus for three-dimensional (3D) printer post-processing equipment according to an embodiment of the present invention, FIG. 2 is an exemplary view of a control operation of a management device according to the embodiment of the present invention, FIG. 3 is an exemplary view of a control operation of a washing device according to the embodiment of the present invention, FIG. 4 is an exemplary view of a control operation of a curing device according to the embodiment of the present invention, and FIG. 5 is an exemplary view of a control operation of a drying device according to the embodiment of the present invention.

Referring to FIG. 1, the control apparatus for 3D printer post-processing equipment according to the embodiment of the present invention includes a memory 100, a processor 200, and post-processing equipment 300.

The post-processing equipment 300 may perform post-processing processes on outputs of a 3D printer. The post-processing equipment 300 may include a management device 310 that manages outputs of the 3D printer, a washing device 320 that washes the outputs, a curing device 330 that cures the outputs, and a drying device 340 that dries the outputs. The post-processing equipment 300 is not limited to the above-described embodiment.

In the memory 100, instructions for performing operations, steps, etc. according to the embodiment of the present invention may be stored. That is, in the memory 100, instructions for analyzing design information and slicing information to extract output feature information such as a product size, a product shape, a product volume, the number of products, and a filling level (density) may be stored. Further, in the memory 100, instructions for extracting parameters on the basis of the output feature information, extracting schedules of the post-processing equipment 300, and then controlling the post-processing equipment 300 according to the parameters and the schedules may be stored.

In the memory 100, various pieces of data used by the processor 200 may be stored. The data may include input data or output data for software and instructions related thereto.

The memory 100 may include at least one storage medium of a flash memory type storage medium, a hard disk type storage medium, a multimedia card micro type storage medium, a card type memory, a random access memory (RAM), a static random access memory (SRAM), a read-only memory (ROM), a programmable read-only memory (PROM), an erasable programmable read-only memory (EPROM), and an electrically erasable programmable read-only memory (EEPROM).

The processor 200 may execute the instructions stored in the memory 100.

The processor 200 may analyze a computer-aided design (CAD) file to extract basic information of a product, analyze a slicing file to extract output analysis information, and then extract output feature information on the basis of the basic information and the output analysis information.

Further, the processor 200 may analyze the output feature information to extract parameters for controlling the post-processing equipment 300, and control the post-processing equipment 300 according to the parameters.

More specifically, the processor 200 may include an output feature information extraction unit 210, a parameter extraction unit 220, and an equipment interlocking control unit 230.

The output feature information extraction unit 210 may receive a CAD file, and a slicing file extracted from the CAD file.

The output feature information extraction unit 210 may analyze the CAD file to extract basic information of a product, and analyze the slicing file to extract output analysis information. Next, the output feature information extraction unit 210 may extract output feature information on the basis of the basic information and the output analysis information.

The output feature information is information that can be used in output management, for example, in post-processing automation processes.

The output feature information may include a product size, the number of products, a product shape, a product volume, and a filling level, but the present invention is not particularly limited thereto.

The product size, the number of products, the product shape, the product volume, and the filling level will be described below.

The output feature information extraction unit 210 may include an input information analysis unit 212, a design model information analysis unit 214, an output model information analysis unit 216, and an integrated information analysis unit 218.

The input information analysis unit 212 may receive the CAD file and the slicing file.

The input information analysis unit 212 may analyze file types of the CAD file and the slicing file to distinguish the file type of the CAD file and the file type of the slicing file.

The input information analysis unit 212 may convert the CAD file into a file of a preset setting type and extract a type of an object to be output on the basis of the number of files in the CAD file.

The setting type may be a file type suitable for analysis by the design model information analysis unit 214. In the present embodiment, a STEP type will be described as an example of the setting type.

The input information analysis unit 212 may input the CAD file to the design model information analysis unit 214.

The input information analysis unit 212 may analyze the slicing file to determine whether the slicing file is a file of a nozzle-type 3D printer or a file of an optical 3D printer.

The input information analysis unit 212 may input the slicing file to the output model information analysis unit 216.

The design model information analysis unit 214 may extract the basic information of the product from a file of a STEP format.

The basic information of the product may include a product size, a product shape, and a product volume. The type of the basic information of the product is not particularly limited.

The output model information analysis unit 216 may analyze the slicing file to extract the output analysis information.

The output analysis information may include the number of products and a total output material usage. The type of the output analysis information is not particularly limited.

The output model information analysis unit 216 may determine whether the slicing file is a file of a nozzle-type 3D printer or a file of an optical 3D printer. According to a result of determining whether the slicing file is a file of a nozzle-type 3D printer or a file of an optical 3D printer, the output model information analysis unit 216 may extract the number of products from the corresponding slicing file.

Further, the output model information analysis unit 216 may extract the total output material usage using amounts of materials used in the product.

The integrated information analysis unit 218 may extract the output feature information on the basis of the basic information output from the design model information analysis unit 214 and the output analysis information output from the output model information analysis unit 216.

The integrated information analysis unit 218 may extract a filling level using the product volume, the number of products, and the total output material usage for all outputs.

The parameter extraction unit 220 may analyze the output feature information to extract the parameters for controlling the post-processing equipment 300, and input the parameters to the equipment interlocking control unit 230.

For example, the parameter extraction unit 220 may extract washing device parameters for controlling the washing device 320, curing device parameters for controlling the curing device 330, and drying device parameters for controlling the drying device 340.

The washing device parameters may include a temperature, an operating time, and a flow rate of the washing device 320.

The curing device parameters may include the quantity of light and an operating time of the curing device 330.

The drying device parameters may include a temperature, an operating time, and an air volume of the drying device 340.

The washing device parameters, the curing device parameters, and the drying device parameters are not limited to the above-described examples.

The equipment interlocking control unit 230 may receive the parameters from the parameter extraction unit 220.

The equipment interlocking control unit 230 may analyze the parameters to extract schedules for controlling operation of the post-processing equipment 300 according to the parameters. For example, the equipment interlocking control unit 230 may extract schedules of the washing device 320, the curing device 330, the drying device 340, and the management device 310. The management device 310 may control output of outputs from the 3D printer, separation of outputs from a base plate, removal of resin on outputs, and transfer of outputs between devices.

The equipment interlocking control unit 230 may extract the schedules according to information on split operation and an operation time of the post-processing equipment 300 and a travel time between the pieces of post-processing equipment 300.

The equipment interlocking control unit 230 may control the operation of the post-processing equipment 300 by inputting operating signals to the post-processing equipment 300 according to the schedules.

The equipment interlocking control unit 230 may control the management device 310 according to the schedules and the parameters. In this case, as illustrated in FIG. 2, the management device 310 may control output of outputs from the 3D printer, separation of outputs from a base plate, removal of resin on outputs, and transfer of outputs between devices.

Further, the equipment interlocking control unit 230 may input the parameters of the post-processing equipment 300 described above to the post-processing equipment 300 so that each piece of the post-processing equipment 300 may perform the post-processing process.

As illustrated in FIG. 3, the equipment interlocking control unit 230 may input the schedule of the washing device 320 and the washing device parameters to the washing device 320, and the washing device 320 may control a washing temperature, a washing time, a washing flow rate, and transfer of outputs of the washing device 320 according to the input washing device parameters.

As illustrated in FIG. 4, the equipment interlocking control unit 230 may input the schedule of the curing device 330 and the curing device parameters to the curing device 330, and the curing device 330 may control the quantity of light, a curing time, and transfer of outputs of the curing device 330 according to the input curing device parameters.

As illustrated in FIG. 5, the equipment interlocking control unit 230 may input the schedule of the drying device 340 and the drying device parameters to the drying device 340, and the drying device 340 may control a drying temperature, a drying time, an air volume, and transfer of outputs of the drying device 340 according to the input drying device parameters.

Although the output feature information extraction unit 210, the parameter extraction unit 220, and the equipment interlocking control unit 230 are described as separated components within the processor 200 in the present embodiment in order to help understanding of the examples, in some examples, the processor 200 may be implemented in a combination that performs each sub-configuration integrally.

Meanwhile, the processor 200 may be implemented as a central processing unit (CPU) or a system on chip (SoC), and may control a plurality of hardware or software components connected to the processor 200 by running an operating system or application, and perform various data processing and calculations. The processor 200 may be configured to execute at least one command stored in the memory 100 and store result data of the execution in the memory 100. To this end, the processor 200 may be implemented with at least one of application specific integrated circuits (ASICs), digital signal processors (DSPs), programmable logic devices (PLDs), field programmable gate arrays (FPGAs), CPUs, microcontrollers, and/or microprocessors, or may include at least one of the above.

Hereinafter, a control method for 3D printer post-processing equipment according to an embodiment of the present invention will be described with reference to FIGS. 6 to 12.

Figure 6:
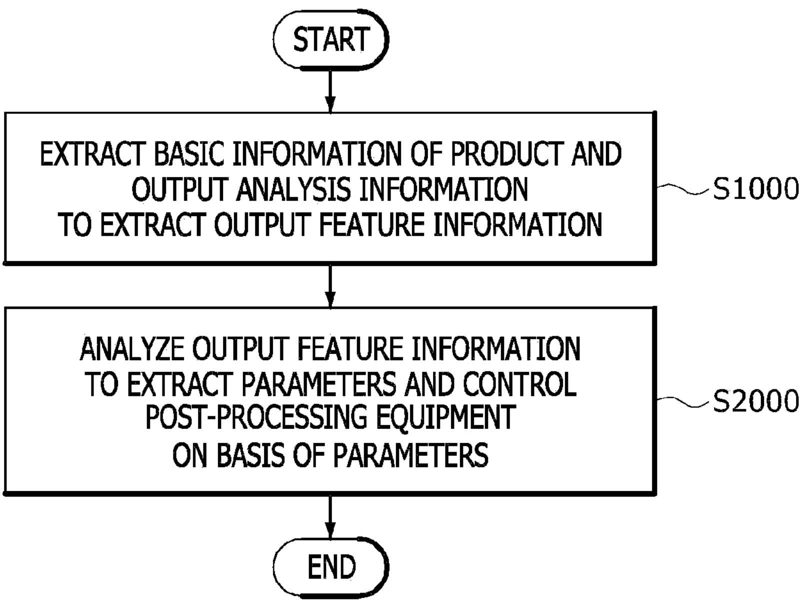
FIG. 6 is a flowchart of a control method for 3D printer post-processing equipment according to an embodiment of the present invention.

FIG. 6 is a flowchart of a control method for 3D printer post-processing equipment according to an embodiment of the present invention.

Referring to FIG. 6, an output feature information extraction unit 210 may receive a CAD file and output analysis information.

The output feature information extraction unit 210 may analyze the CAD file to extract basic information of a product, analyze a slicing file to extract output analysis information, and then extract output feature information on the basis of the basic information and the output analysis information (S1000).

Figure 7:
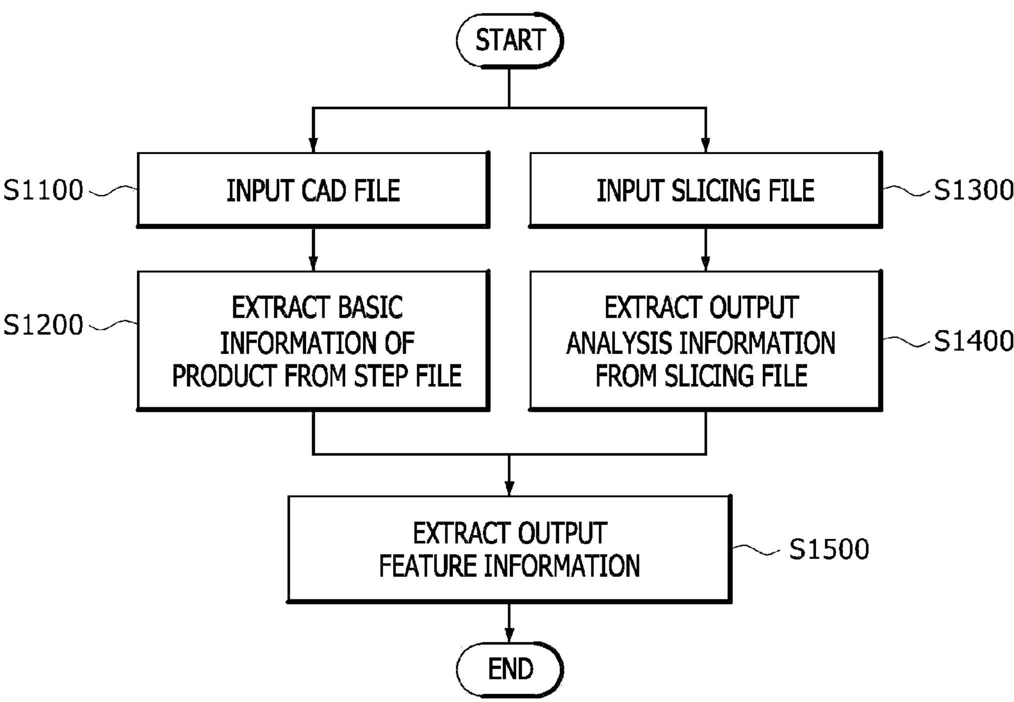
FIG. 7 is a flowchart of a process of extracting output feature information according to an embodiment of the present invention.

FIG. 7 is a flowchart of a process of extracting the output feature information according to the embodiment of the present invention.

Referring to FIG. 7, first, an input information analysis unit 212 inputs the CAD file to a design model information input unit (S1100).

The input information analysis unit 212 may analyze file types of the CAD file and the slicing file to distinguish the file type of the CAD file and the file type of the slicing file.

Here, the input information analysis unit 212 may identify a format of the CAD file. For example, the input information analysis unit 212 may divide the CAD file into a STEP format, an STL format, an OBJ format, etc.

The input information analysis unit 212 may extract a type of an object to be output on the basis of the number of files in the CAD file.

The input information analysis unit 212 may convert the CAD file into a file of a preset STEP format according to the format of the CAD file, and input the file of the STEP format to the design model information analysis unit 214.

The design model information analysis unit 214 may extract the basic information of the product from the file of the STEP format received from the input information analysis unit 212 (S1200).

The basic information of the product may include a product size, a product shape, and a product volume.

Figure 8:
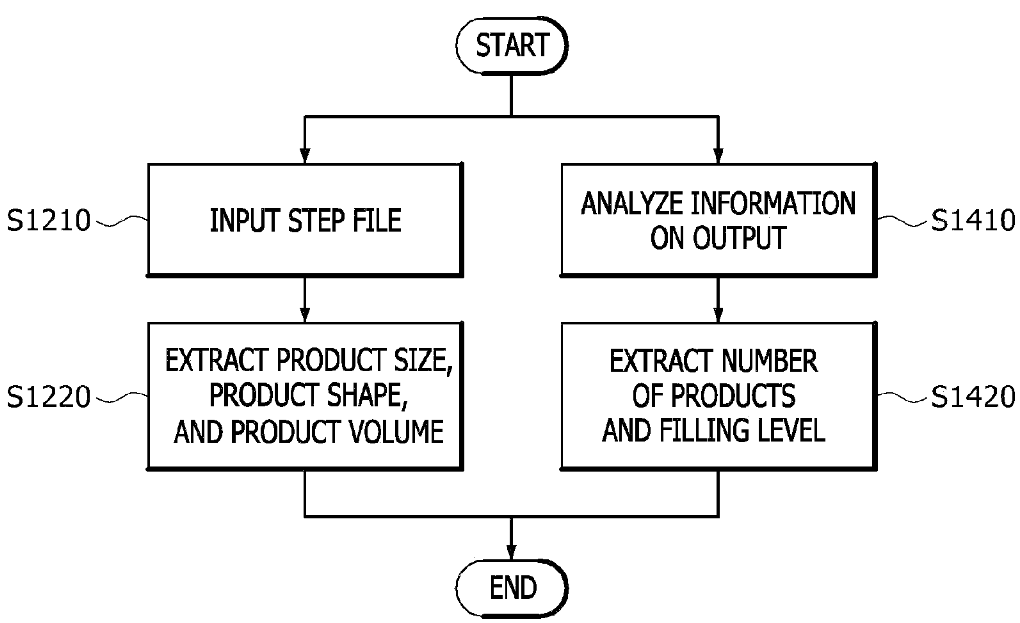
FIG. 8 is a flowchart illustrating a process of extracting basic information of a product of FIG. 7.

FIG. 8 is a flowchart illustrating a process of extracting the basic information of the product of FIG. 7.

Referring to FIG. 8, the design model information analysis unit 214 may receive the file of the STEP format from the input information analysis unit 212 (S1210).

The design model information analysis unit 214 analyzes the input file of the STEP format to extract a product size, a product shape, and a product volume (S1220).

Figure 9:
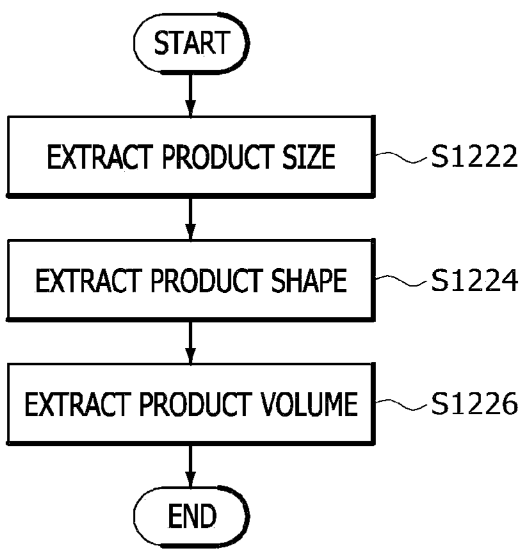
FIG. 9 is a flowchart illustrating a process of extracting a product size, a product shape, and a product volume of FIG. 8.

FIG. 9 is a flowchart illustrating a process of extracting the product size, the product shape, and the product volume of FIG. 8.

Referring to FIG. 9, the design model information analysis unit 214 may analyze the product size on the basis of a boundary box of the product. That is, the design model information analysis unit 214 may analyze the product size by analyzing an outermost point of a single product in the file of the STEP format (S1222).

The design model information analysis unit 214 may image the product in various ways and extract the product shape using an image processing method (S1224). The design model information analysis unit 214 may identify the product shape as a spherical shape, a cylindrical shape, a polyhedral shape, etc.

The design model information analysis unit 214 may extract the product volume by performing integration on an area between layers of the product on the basis of point, line, and surface information of a single product in the file of the STEP format (S1226).

The design model information analysis unit 214 may input the basic information of the product to an integrated information analysis unit 218.

Meanwhile, the input information analysis unit 212 may input the slicing file to an output model information analysis unit 216 (S1300).

The input information analysis unit 212 may identify the file type of the slicing file through analysis of an extension name or file structure of the slicing file. In this case, the input information analysis unit 212 may determine whether the slicing file is a file of a nozzle type 3D printer, for example, a file of a fused deposition modeling (FDM) type 3D printer, or a file of an optical 3D printer such as a stereolithography apparatus (SLA), digital light processing (DLP), or the like.

The input information analysis unit 212 may input the slicing file to the output model information analysis unit 216.

The output model information analysis unit 216 may analyze the slicing file to extract the output analysis information (S1400).

Referring to FIG. 8, the output model information analysis unit 216 may receive the slicing file from the input information analysis unit 212 (S1410).

The output model information analysis unit 216 may analyze the slicing file to extract the output analysis information (S1420).

The output analysis information may include the number of products and a filling level.

Figure 10:
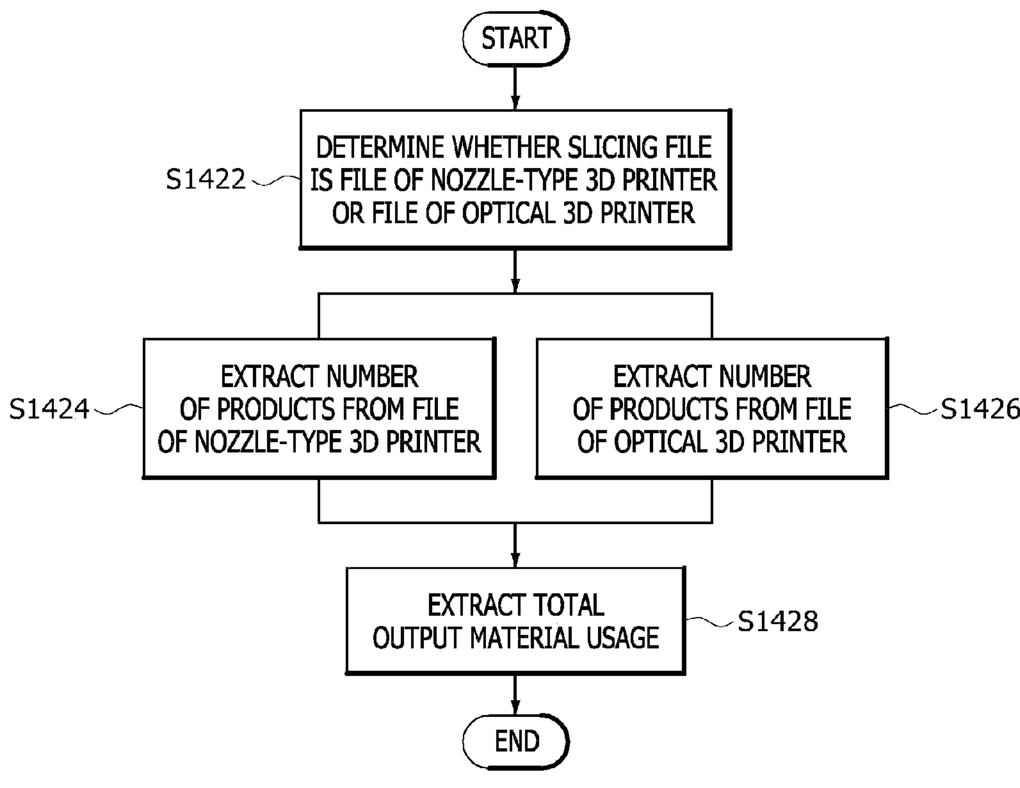
FIG. 10 is a flowchart illustrating a process of extracting the number of products and a total output material usage of FIG. 8.

FIG. 10 is a flowchart illustrating a process of extracting the number of products and a total output material usage of FIG. 8.

Referring to FIG. 10, the output model information analysis unit 216 may analyze information of outputs from the slicing file to determine whether the slicing file is a file of a nozzle-type 3D printer or a file of an optical 3D printer (S1422).

When it is determined that the slicing file is a file of a nozzle-type 3D printer, the output model information analysis unit 216 may analyze the product shape on the basis of the presence or absence of nozzle output in G-code to extract the number of products. That is, the output model information analysis unit 216 may analyze the shape of the stacked product on the basis of the presence or absence of nozzle output in G-code to extract the number of independently output products (S1424).

When it is determined that the slicing file is a file of an optical 3D printer, the output model information analysis unit 216 may distinguish contrast parts and non-contrast parts in a tomographic contrast image, stack the contrast parts and the non-contrast parts according to a list, and extract the number of products. That is, the output model information analysis unit 216 may distinguish the contrast parts and the non-contrast parts in a tomographic contrast image using an image processing technique from a slicing program consisting of a header file and a list of tomographic contrast images, stack the contrast parts and the non-contrast parts according to the list, and extract the number of independently output products (S1426).

Further, the output model information analysis unit 216 may extract the total output material usage using amounts of materials used in each product in the nozzle-type 3D printer or the optical 3D printer (S1428).

The output model information analysis unit 216 may input the above-described output analysis information to the integrated information analysis unit 218.

Meanwhile, the integrated information analysis unit 218 may extract the output feature information on the basis of the basic information output from the design model information analysis unit 214 and the output analysis information output from the output model information analysis unit 216 (S1500).

Figure 11:
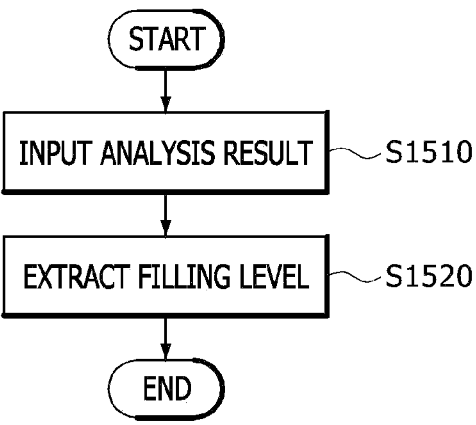
FIG. 11 is a flowchart illustrating a process of extracting output feature information of FIG. 7.

FIG. 11 is a flowchart illustrating a process of extracting the output feature information of FIG. 7.

Referring to FIG. 11, the integrated information analysis unit 218 may receive the basic information from the design model information analysis unit 214 and receive the output analysis information from the output model information analysis unit 216 (S1510).

The integrated information analysis unit 218 may extract the filling level as follows using the product volume input from the design model information analysis unit 214 and the output analysis information input from the output model information analysis unit 216 (S1520).

$$\text{Filling level} = \text{Total output material usage}/(\text{Number of products} \times \text{Product volume})$$

In this way, the integrated information analysis unit 218 may output the output feature information by extracting the filling level.

Next, a processor 200 may analyze the output feature information to extract parameters for controlling post-processing equipment 300, and control the post-processing equipment 300 according to the parameters (S2000).

Figure 12:
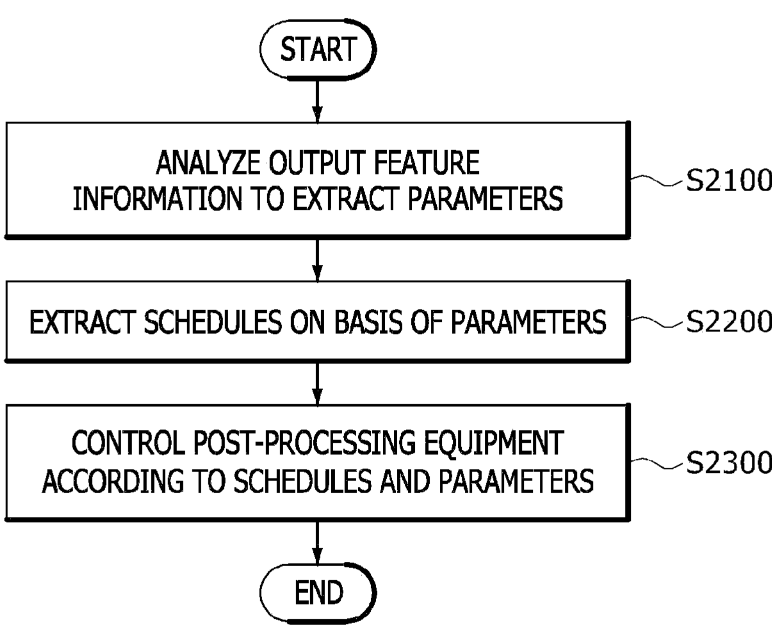
FIG. 12 is a flowchart of a method of extracting parameters and controlling post-processing equipment according to an embodiment of the present invention.

FIG. 12 is a flowchart of a method of extracting parameters and controlling post-processing equipment according to an embodiment of the present invention.

Referring to FIG. 12, a parameter extraction unit 220 may analyze output feature information, that is, a product size, a product shape, a product volume, a filling level, and the number of products, to set parameters of each piece of post-processing equipment (S2100).

For example, the parameter extraction unit 220 may extract washing device parameters for controlling a washing device 320, curing device parameters for controlling a curing device 330, and drying device parameters for controlling a drying device 340.

The washing device parameters may include a temperature, an operating time, and a flow rate of the washing device 320.

The curing device parameters may include the quantity of light and an operating time of the curing device 330.

The drying device parameters may include a temperature, an operating time, and an air volume of the drying device 340.

An equipment interlocking control unit 230 may receive the parameters from the parameter extraction unit 220, analyze the parameters, and extract schedules for controlling operation of the post-processing equipment 300 according to the parameters (S2200). In this case, the equipment interlocking control unit 230 may extract the schedules in consideration of information on split operation and an operation time of each piece of the post-processing equipment 300 and a transfer time between the pieces of post-processing equipment 300.

The equipment interlocking control unit 230 may control the post-processing equipment 300 according to the extracted schedules and parameters (S2300).

That is, the equipment interlocking control unit 230 may transmit the schedules and the parameters to each piece of post-processing equipment 300.

The equipment interlocking control unit 230 may control the operation of the post-processing equipment 300 by inputting operating signals to the post-processing equipment 300 according to the schedules.

The equipment interlocking control unit 230 may control the management device 310 according to the schedules and the parameters. In this case, the management device 310 may control output of outputs from the 3D printer. The management device 310 may separate the outputs from a base plate after the output of the outputs is completed. After the outputs are separated, the management device 310 may place the outputs in a basket with holes to remove any residual resin on the outputs and wait for a preset waiting period of time. The management device 310 may transfer the outputs for which the removal of the resin is completed to the next process equipment. Further, the management device 310 may perform each step according to a completion time point of a preceding step step by step, and transmit performance completion information to the equipment interlocking control unit 230.

The equipment interlocking control unit 230 may input the parameters of the post-processing equipment 300 described above to the post-processing equipment 300 so that each piece of post-processing equipment 300 may perform the post-processing process.

The equipment interlocking control unit 230 may input the schedule of the washing device 320 and the washing device parameters to the washing device 320. In this case, the washing device 320 may control a washing temperature, a washing time, a washing flow rate, and transfer of outputs of the washing device 320 according to the input washing device parameters. When washing is completed, the washing device 320 may transmit completion information to the equipment interlocking control unit 230.

The equipment interlocking control unit 230 may input the schedule of the curing device 330 and the curing device parameters to the curing device 330. In this case, the curing device 330 may control the quantity of light, a curing time, and transfer of outputs of the curing device 330 according to the input curing device parameters. When curing is completed, the curing device 330 may transmit completion information to the equipment interlocking control unit 230.

The equipment interlocking control unit 230 may input the schedule of the drying device 340 and the drying device parameters to the drying device 340. In this case, the drying device 340 may control a drying temperature, a drying time, an air volume, and transfer of outputs of the drying device 340 according to the input drying device parameters. When drying is completed, the drying device 340 may transmit completion information to the equipment interlocking control unit 230.

In this way, in the control apparatus and method for 3D printer post-processing equipment according to the embodiments of the present invention, by analyzing CAD information and slicing information, output feature information such as a product size, a product shape, a product volume, the number of products, and a filling level may be extracted.

Further, in the control apparatus and method for 3D printer post-processing equipment according to the embodiments of the present invention, by automating post-processing processes of a 3D printer, the quality of outputs can be improved and human work can be minimized.

The term "unit" used in this specification may include a unit composed of hardware, software, or firmware and, for example, may be used interchangeably with a term such as "logic," "logic block," "part," "circuit," or the like. The unit may be an integrally constituted part or a minimum unit or a part thereof that performs one or more functions. For example, the unit may be configured as an ASIC.

While the present invention has been described with reference to embodiments illustrated in the accompanying drawings, the embodiments should be considered in a descriptive sense only, and it should be understood by those skilled in the art that various alterations and other equivalent embodiments may be made. Therefore, the scope of the present invention should be defined by only the following claims.

What is claimed is:

1. A control apparatus for controlling post-processing equipment for outputs of a three-dimensional (3D) printer, comprising:
- a processor; and
- a memory configured to store an instruction executed by the processor,
- wherein the processor:
- analyzes a computer-aided design (CAD) file to extract basic information of a product,
- analyzes a slicing file corresponding to the product to extract output analysis information of an output produced from the product,
- extracts output feature information of the output on the basis of the basic information and the output analysis information,
- analyzes the output feature information to determine a printer type and output characteristics including a number of outputs and a total output material usage, and to extract, prior to execution of post-processing, a parameter for controlling post-processing equipment, and
- controls the post-processing equipment according to the parameter,
- wherein the parameter includes at least one of a washing device parameter for controlling a washing device, a curing device parameter for controlling a curing device, and a drying device parameter for controlling a drying device.

2. The control apparatus of claim 1, wherein the processor;
- converts the CAD file into a file of a preset format, the preset format comprising a Standard for the Exchange of Product model data (STEP) format,
- extracts an object type indicating a single object or multiple objects to be output on the basis of a number of files in the CAD file, and
- analyzes the slicing file to determine whether the slicing file corresponds to a nozzle-type 3D printer or an optical 3D printer.

3. The control apparatus of claim 1, wherein the output feature information includes at least one of a product size, a product shape, a product volume, a number of products, and a filling level.

4. The control apparatus of claim 3, wherein the processor analyzes an outermost point of the product to extract the product size.

5. The control apparatus of claim 3, wherein the processor images the product in various ways to extract the product shape using an image processing method.

6. The control apparatus of claim 3, wherein the processor extracts the product volume by performing integration on an area between layers of the product on the basis of point, line, and surface information of the product.

7. The control apparatus of claim 3, wherein, when it is determined that the slicing file corresponds to a nozzle-type 3D printer, the processor analyzes the product shape on the basis of the presence or absence of nozzle output in G-code to extract the number of products, or when it is determined that the slicing file corresponds to an optical 3D printer, the processor distinguishes a contrast part and a non-contrast part in a tomographic contrast image, stacks the contrast part and the non-contrast part according to a list, and extracts the number of products.

8. The control apparatus of claim 3, wherein the processor extracts the filling level using the product volume, the number of products, and the total output material usage for all outputs, and extracts the total output material usage using amounts of materials used in the product.

9. The control apparatus of claim 1, wherein the processor analyzes the output feature information to extract the parameter, extracts a schedule for controlling operation of the post-processing equipment prior to execution of post-processing according to the parameter, and controls the post-processing equipment according to the schedule and the parameter.

10. The control apparatus of claim 9, wherein the processor extracts the schedule according to divided operation information and operation time of the post-processing equipment and a travel time between pieces of the post-processing equipment.

11. The control apparatus of claim 9, wherein the washing device parameter includes at least one of a temperature, an operating time, and a flow rate of the washing device, the curing device parameter includes at least one of a quantity of light and an operating time of the curing device, and the drying device parameter includes at least one of a temperature, an operating time, and an air volume of the drying device.

12. The control apparatus of claim 9, wherein the processor transmits the parameter to the post-processing equipment, and the post-processing equipment performs post-processing processes according to the parameter.

13. The control apparatus of claim 12, wherein the processor controls, with respect to a washing device for washing the output, at least one of a washing temperature, a washing time, a washing flow rate, and transfer of the output from the washing device.

14. The control apparatus of claim 12, wherein the processor controls, with respect to a curing device for curing the output, at least one of a quantity of light, a curing time, and transfer of the output from the curing device.

15. The control apparatus of claim 12, wherein the processor controls, with respect to a drying device for drying the output, at least one of a drying temperature, a drying time, an air volume, and transfer of the output from the drying device.

16. The control apparatus of claim 12, wherein the processor allows a management device to control at least one of an output from the 3D printer, separation of the output from a base plate, removal of resin on the output, and transfer of the output between devices.

17. A control method for controlling post-processing equipment for outputs of a three-dimensional (3D) printer, comprising:

analyzing, by a processor, a computer-aided design (CAD) file to extract basic information of a product, analyzing a slicing file corresponding to the product to extract output analysis information of an output produced from the product, and extracting output feature information of the output on the basis of the basic information and the output analysis information; and analyzing, by the processor, the output feature information to determine a printer type and output characteristics including a number of outputs and a total output material usage, and to extract, prior to execution of post-processing, a parameter for controlling post-processing equipment, and controlling the post-processing equipment according to the parameter, wherein the parameter includes at least one of a washing device parameter for controlling a washing device, a curing device parameter for controlling a curing device, and a drying device parameter for controlling a drying device.

18. The control method of claim 17, wherein the output feature information includes at least one of a product size, a product shape, a product volume, a number of products, and a filling level.

19. The control method of claim 17, wherein, in the controlling of the post-processing equipment, the processor analyzes the output feature information to extract the parameter, extracts a schedule for controlling operation of the post-processing equipment according to the parameter, and controls the post-processing equipment prior to execution of post-processing according to the schedule and the parameter.

20. The control method of claim 17, wherein the washing device parameter includes at least one of a temperature, an operating time, and a flow rate of the washing device, the curing device parameter includes at least one of a quantity of light and an operating time of the curing device, and the drying device parameter includes at least one of a temperature, an operating time, and an air volume of the drying device.

* * * * *